US011953897B2

(12) United States Patent
Wulf (10) Patent No.: US 11,953,897 B2
(45) Date of Patent: Apr. 9, 2024

(54) CONTROL METHOD AND CONTROL DEVICE FOR TRANSFERRING A UTILITY VEHICLE INTO A TARGET POSITION, AND UTILITY VEHICLE

(71) Applicant: WABCO GMBH, Hannover (DE)

(72) Inventor: Oliver Wulf, Neustadt (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 646 days.

(21) Appl. No.: 17/266,140

(22) PCT Filed: Aug. 8, 2019

(86) PCT No.: PCT/EP2019/071325
§ 371 (c)(1),
(2) Date: Feb. 5, 2021

(87) PCT Pub. No.: WO2020/035389
PCT Pub. Date: Feb. 20, 2020

(65) Prior Publication Data
US 2021/0294318 A1 Sep. 23, 2021

(30) Foreign Application Priority Data

Aug. 13, 2018 (DE) ...................... 10 2018 119 646.6
Aug. 31, 2018 (DE) ...................... 10 2018 121 272.0

(51) Int. Cl.
*G05D 1/00* (2006.01)
(52) U.S. Cl.
CPC ......... *G05D 1/0011* (2013.01); *G05D 1/0055* (2013.01)

(58) Field of Classification Search
CPC ........................ G05D 1/0011; G05D 1/0055
(Continued)

(56) References Cited

U.S. PATENT DOCUMENTS 10,246,131 B2 4/2019 Terkes et al.
10,692,382 B2 * 6/2020 Urhahne ................ B60K 37/06
(Continued)

FOREIGN PATENT DOCUMENTS

CN 103079935 A 5/2013
CN 105916758 A 8/2016
(Continued)

*Primary Examiner* — Peter D Nolan
*Assistant Examiner* — Luke Huynh
(74) *Attorney, Agent, or Firm* — LEYDIG, VOIT & MAYER, LTD.

(57) ABSTRACT

A control method, for the semi-automatic transfer of a driven utility vehicle into a sensor-identifiable target position, includes sensing a relative position of the utility vehicle in relation to the target position and deriving, from the relative position, an automatic, rules-based lateral control of the utility vehicle configured to, together with a longitudinal control, transfer the utility vehicle into the target position. The method further includes detecting, with the aid of a remote control transmitter of the utility vehicle, the presence of an activation signal generated by an operator located outside of the utility vehicle, initiating, in response to the detection of the presence of the activation signal, the transfer of the utility vehicle according to the lateral control and the longitudinal control, and detecting an absence of the activation signal and interrupting the transfer to bring the utility vehicle to a standstill.

9 Claims, 10 Drawing Sheets

(58) Field of Classification Search
USPC .............................................................. 701/2
See application file for complete search history.

(56) References Cited

U.S. PATENT DOCUMENTS

| | | |
|---|---|---|
| 2013/0073119 A1 | 3/2013 | Hueger et al. |
| 2015/0127208 A1* | 5/2015 | Jecker ................ B62D 15/0285 |
| | | 701/23 |

FOREIGN PATENT DOCUMENTS

| | | | |
|---|---|---|---|
| CN | 106029473 A | 10/2016 | |
| DE | 10101342 A1 * | 7/2002 | ............... B62D 1/28 |
| DE | 10101342 A1 | 7/2002 | |
| DE | 102005036794 A1 | 2/2007 | |
| DE | 102008033925 A1 | 1/2010 | |
| DE | 102012007984 A1 * | 3/2013 | ............... B62D 1/00 |
| DE | 102012007984 A1 | 3/2013 | |
| DE | 102012007986 A1 | 10/2013 | |
| DE | 102013015738 A1 | 4/2014 | |
| DE | 102014013219 A1 | 4/2015 | |
| DE | 102016011324 A1 | 3/2018 | |
| EP | 3248857 A1 | 11/2017 | |

* cited by examiner

CONTROL METHOD AND CONTROL DEVICE FOR TRANSFERRING A UTILITY VEHICLE INTO A TARGET POSITION, AND UTILITY VEHICLE

CROSS-REFERENCE TO PRIOR APPLICATIONS

This application is a U.S. National Phase Application under 35 U.S.C. § 371 of International Application No. PCT/EP2019/071325, filed on Aug. 8, 2019, and claims benefit to German Patent Applications No. DE 10 2018 119 646.6, filed on Aug. 13, 2018, and DE 10 2018 121 272.0, filed on Aug. 31, 2018. The International Application was published in German on Feb. 20, 2020 as WO 2020/035389 A1 under PCT Article 21(2).

FIELD

The present disclosure relates to a control method and a control device for the semi-automatic, remote-control-supported transfer of a driven utility vehicle into a target position comprising a target location and a target orientation, and to a utility vehicle configured therefor.

BACKGROUND

DE 10 2016 011 324 A1 describes a method for controlling a towing vehicle during its approach and coupling to a trailer vehicle. The rear surroundings behind the towing vehicle are detected, for example, with a camera; on the basis of the gathered data, an offset distance and an offset angle between the towing vehicle and the trailer vehicle are evaluated; at least one travel trajectory is calculated, with the aid of which the towing vehicle is autonomously movable to a coupling point, and the towing vehicle is autonomously moved and coupled thereto according to the travel trajectory. Nothing is described in the publication regarding a utilization of the method in uncontrolled surroundings or regarding appropriate handling with, in particular unexpectedly, emerging obstacles.

DE 10 2014 013 219 A1 describes an assistance system for maneuvering a vehicle combination. Multiple driving maneuvers with different trajectories are provided to an operator located in the towing vehicle. After selection of a driving maneuver, the assistance system moves the vehicle combination along the associated trajectory. The operator can interrupt this movement via an appropriate input into the assistance system. At least the lateral guidance, i.e., the steering of the vehicle combination, is automatically carried out by the assistance system. The longitudinal guidance of the towing vehicle, for example, by controlling a power train and a braking system, can be carried out either by the operator or by the assistance system.

DE 101 01 342 A1 describes a maneuvering device for a utility vehicle with utilization of a remote control for carrying out driverless positioning maneuvers. The maneuvering device makes it possible for a person located outside of the vehicle to maneuver a tractor of the vehicle into a parking position. An indicated refinement relates to a self-learning function, in the case of which maneuvering processes, which have been carried out once, can be stored and automatically repeated by the maneuvering device. In the latter case, a transmitter of the remote control has a stop function, which the vehicle driver can activate and, therefore, prematurely terminate the automatic control. The positioning maneuvers from DE 101 01 342 A1 are either completely remote-controlled by the person, or completely automatically carried out by the maneuvering device comprising a self-learning function.

SUMMARY

In an embodiment, the present invention provides a control method for the semi-automatic transfer of a driven utility vehicle into a sensor-identifiable target position. The method includes sensing a relative position of the utility vehicle in relation to the target position and deriving, from the relative position, an automatic, rules-based lateral control of the utility vehicle configured to, together with a longitudinal control, transfer the utility vehicle into the target position. The method further includes detecting, with the aid of a remote control transmitter of the utility vehicle, the presence of an activation signal generated by an operator located outside of the utility vehicle, initiating, in response to the detection of the presence of the activation signal, the transfer of the utility vehicle according to the lateral control and the longitudinal control, and detecting an absence of the activation signal and interrupting the transfer to bring the utility vehicle to a standstill.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The present disclosure provides control methods and control devices for transferring a towing vehicle into a target position, in the case of which a reliable operation becomes possible, with low device complexity and, nevertheless, simple handling, even in uncontrolled surroundings.

Controlled surroundings are understood, in this case, to be surroundings, in which no unexpected persons or objects emerge, and in which unintentional movements, including weather events and changes of material properties, do not occur. This typically requires conditions such as access control, artificial illumination, rain and weather protection. Surroundings that at least do not deliver all these preconditions are therefore referred to as uncontrolled surroundings.

Position, such as relative position or target position, is understood as comprising location information and orientation information in each case. The location information can take place, absolutely or relatively, for example, by using coordinates in a two- or three-dimensional coordinate system. The orientation information can take place by using two- or three-dimensional angle information together with an agreement regarding the reference point and the reference angle.

Lateral control refers, in this case, to an action upon the steering axle of the utility vehicle. In the case of vehicles with multiple steered axles, this can also encompass an appropriate action upon axles other than the main steering axle.

Longitudinal control refers, in this case, to an action upon the drive train and the braking system of the utility vehicle.

The target position can be a coupling position, i.e., a position within the scope of location and orientation, at which the utility vehicle can be coupled to a trailer or semitrailer vehicle. The sensing of the target position can take place, advantageously, via a sensor and at least two reference marks, which are detectable in a distinguishable manner, on the trailer or semitrailer vehicle.

The target position can also be a loading position, i.e., a position at a loading ramp that makes it possible to load or unload the utility vehicle. Such a position can also be sensed, advantageously, with the aid of reference marks, which are positioned in a known way and are detectable in a distinguishable manner, on or in the proximity of the loading ramp.

The target position can also be a charging position, i.e., a position at which operating means, such as fuel, battery charge, or hydraulic fluid, can be supplied to the utility vehicle via a connection to a supply device.

Such a position can also be sensed, advantageously, with the aid of reference marks, which are positioned in a known way and are detectable in a distinguishable manner, on or in the proximity of the supply device.

The progress of a transfer of the utility vehicle into the target position can be described, for example, by the distance traveled since the beginning of the transfer with respect to the likely total distance. Alternatively, the progress can be described, for example, by the travel time that has elapsed since the beginning of the transfer with respect to the likely total travel time.

The sensor of the utility vehicle can be, for example, a laser scanner, or a still camera, or a video camera. A determination of orientation and distance is possible with only one sensor when at least two reference marks, which are positioned in a known way and are detectable in a distinguishable manner, have been applied at the target position.

Control methods for transferring a utility vehicle into a target position encompass, according to the present disclosure, sensing a relative position of the utility vehicle in relation to the target position. Subsequently, an automatic, rules-based lateral control of the utility vehicle is derived from the relative position in such a way that the lateral control, together with a longitudinal control, transfers the utility vehicle into the target position. According to the present disclosure, additionally, the presence of an activation signal generated by an operator located outside of the utility vehicle with the aid of a remote control transmitter is checked with the aid of a remote control receiving device of the utility vehicle.

The transfer of the utility vehicle according to the lateral control and the longitudinal control is initiated only when the activation signal is present for the first time, and the transfer is interrupted and the utility vehicle is brought to a standstill, for example, with the aid of a suitable braking action, if the activation signal is absent.

For this purpose, the utility vehicle must comprise a sensor and the target position must be sensor-identifiable, for example, with the aid of sensor-identifiable reference marks.

In an advantageous expansion of the control method, additionally, a time-dependent longitudinal control signal input by the operator is received with the remote control receiving device and the transfer takes place according to the lateral control and the received longitudinal control signal. Due to this mixed operation, in which the lateral control takes place automatically and the longitudinal control takes place via remote control, the disembarked operator, when positioned properly, can take all conditions in the surroundings of the transfer process into account when inputting the longitudinal control signal. Complex additional sensor systems for monitoring safety risks in uncontrolled surroundings are therefore avoided.

In a further advantageous expansion, the control method is designed in such a way that a maximum speed permitted as part of the longitudinal control is limited. This limitation can be selected, advantageously, depending on an instantaneous relative position, on the progress of the transfer, and/or on a current or impending state of the lateral control. In particular in the case of intense steering operations within the scope of large steering angles, the maximum speed is advantageously further reduced. Due to the fact that the lateral control=steering is determined by the control method, a reduction of the maximum speed is also possible in a forward-looking manner. This is advantageous, in particular, in the case of steering large, heavy and, therefore, massive utility vehicles.

In a further advantageous expansion of the control method, additionally, a level regulating signal generated by the operator is received with the remote control receiving device and, during the transfer, a level regulating device present in the utility vehicle is guided according to the received level regulating signal. This is advantageous, for example, when the target position is a coupling position, because such couplings always also require a precise height adjustment of the towing vehicle with respect to the trailer/semitrailer for the purpose of engagement. A level regulating signal predefinable by the operator is also advantageous when the target position is a loading position, in order to achieve a stepless transition from the loading ramp into the interior of the utility vehicle.

In a further advantageous expansion of the control method, when the relative position is sensed as a start position for the first time, a check is carried out to determine whether a transfer to the target position from this start position is even possible. If this is not possible, the transfer is not initiated and the operator can be informed thereof.

In a further advantageous expansion of the control method, a check is carried out during the transfer to determine whether the remainder of the transfer can even be concluded as intended and without incurring damage. If this is not possible, the transfer is aborted; once again, the operator can be informed thereof.

Figure 1:
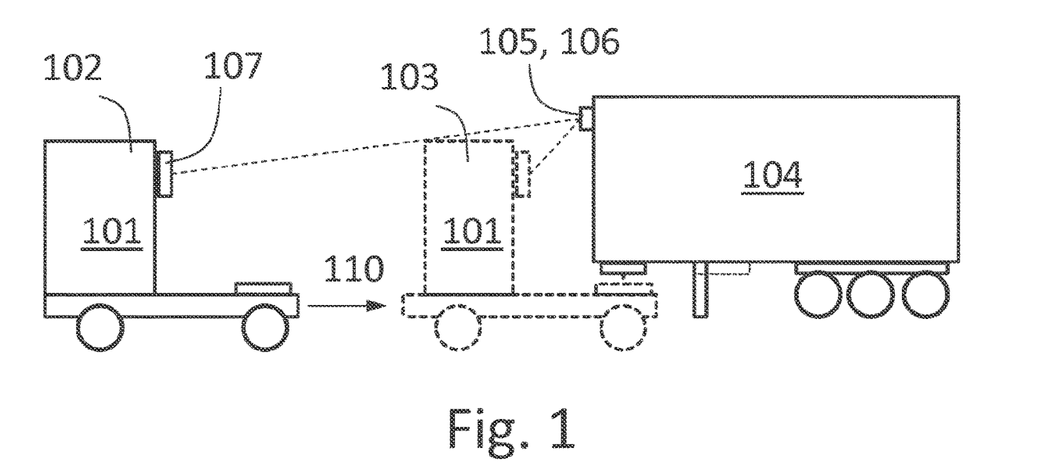
FIG. 1 schematically shows, in a side view, an application where the target position is a coupling position.
Figure 2:
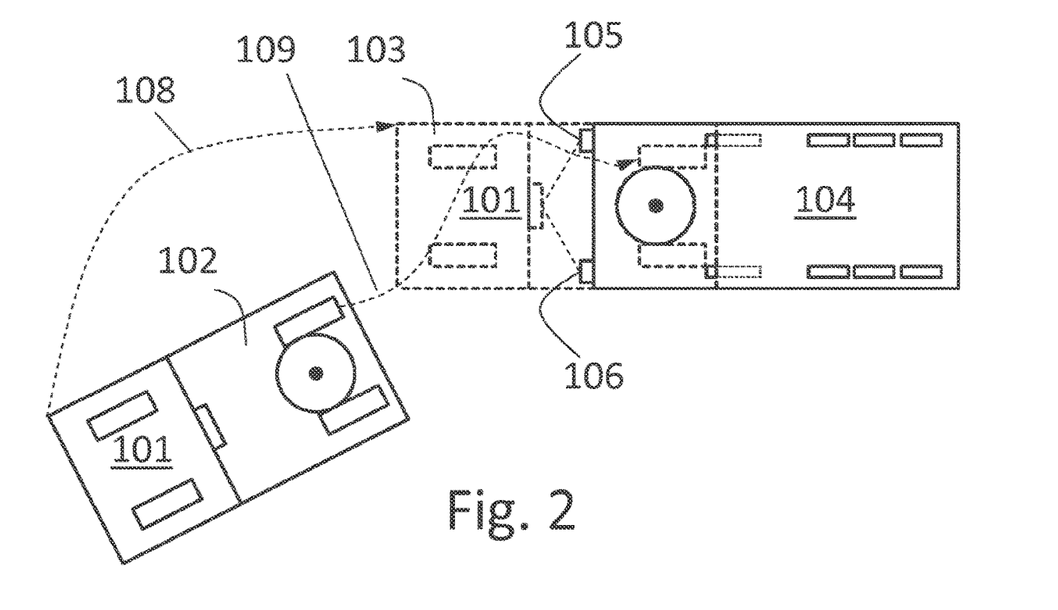
FIG. 2 schematically shows, in a top view, the application where the target position is a coupling position.

FIG. 1 schematically shows, in a side view, an application where the target position 103 is a coupling position. FIG. 2 shows this application schematically in a top view. The utility vehicle 101 is shown in its start position 102 and in its target position 103. From the start position 102, the utility vehicle 101 is brought into its target position 103 along a route 108, 109, 110. At the target position 103, the utility vehicle 101 can be coupled to a semitrailer vehicle 104. The utility vehicle 101 comprises a sensor 107. The sensing of the target position 103 can advantageously take place, in this case, via at least two reference marks 105, 106, which are detectable in a distinguishable manner, on the semitrailer vehicle 104. During the transfer, the sensor 107 measures the direction and distance to the two reference marks 105, 106.

Figure 3:
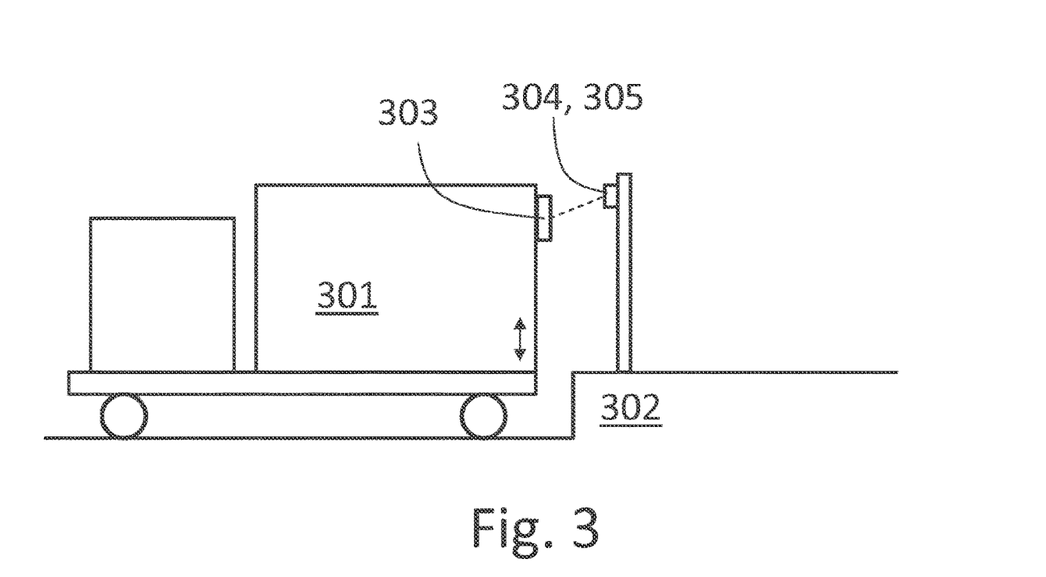
FIG. 3 schematically shows, in a side view, an application where the target position is a loading position.
Figure 4:
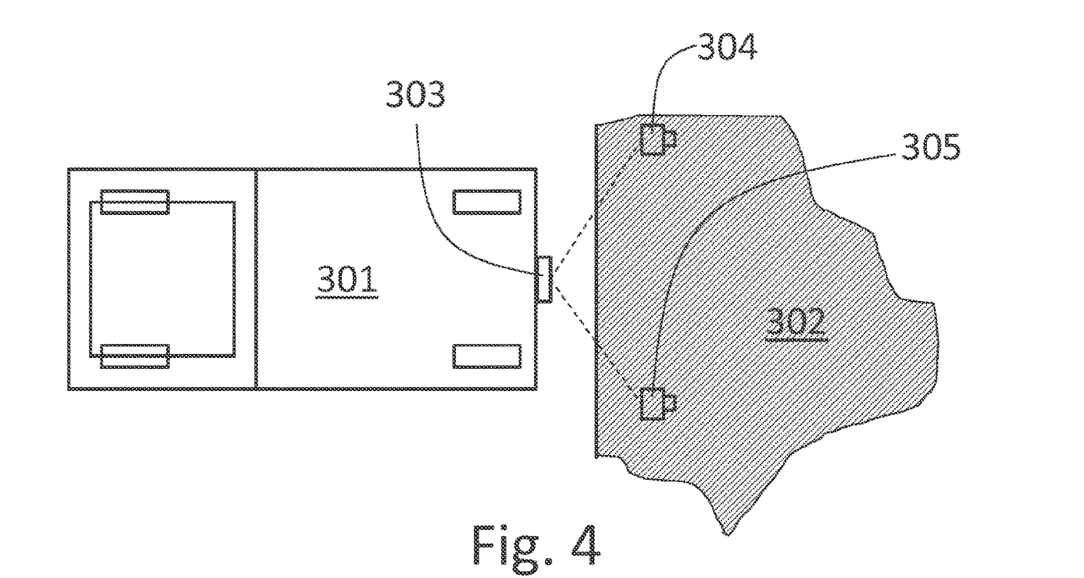
FIG. 4 schematically shows, in a top view, the application where the target position is a loading position.

FIG. 3 schematically shows, in a side view, an application where the target position is a loading position. FIG. 4 shows this application schematically in a top view. The utility vehicle 301 comprising a sensor 303 is shown at its target position at a loading ramp 302. The target position is established in relation to the loading ramp 302 in such a way that the utility vehicle 301 can be loaded or unloaded at the loading ramp 302. Such a position can also be sensed with the sensor 303, advantageously, with the aid of reference marks 304, 305, which are positioned in a known way and are detectable in a distinguishable manner, on or in the proximity of the loading ramp 302. The sensor 303 measures the direction and distance to the two reference marks 304, 305.

Figure 5:
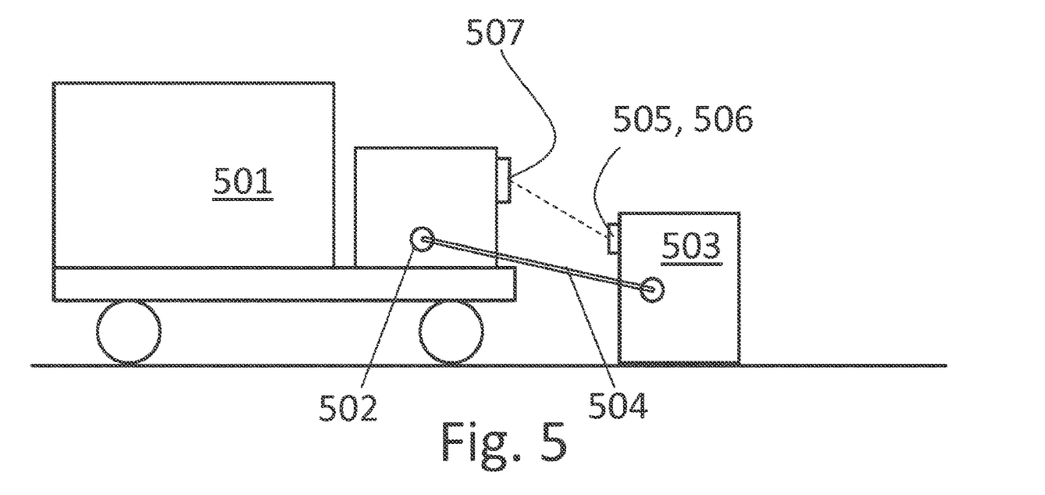
FIG. 5 schematically shows, in a side view, an application where the target position is a charging position.
Figure 6:
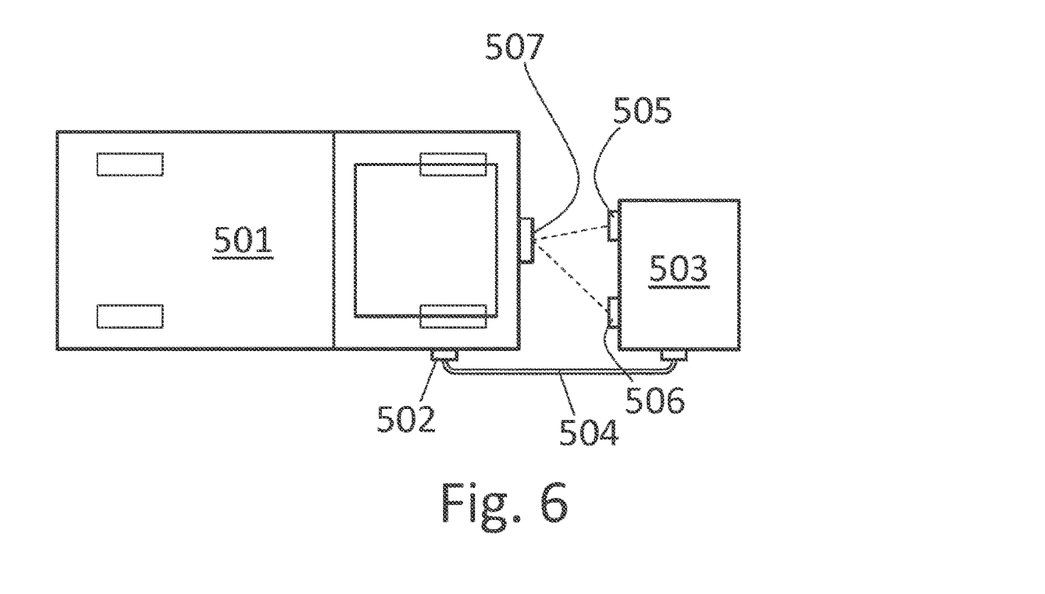
FIG. 6 schematically shows, in a top view, the application where the target position is a charging position.

FIG. 5 schematically shows, in a side view, an application where the target position is a charging position. FIG. 6 shows this application schematically in a top view. The utility vehicle 501 comprising an operating means port 502 and a sensor 507 is shown at its target position at a supply device 503. The target position is established in such a way that, at the target position, operating means such as fuel, battery charge, or hydraulic fluid can be supplied to the utility vehicle 501 via an operating means line 504. Such a position can also be sensed with the sensor 507, advantageously, with the aid of reference marks 505, 506, which are positioned in a known way and are detectable in a distinguishable manner, on or in the proximity of the supply device 503. The sensor 507 measures the direction and distance to the two reference marks 505, 506.

Figure 7:
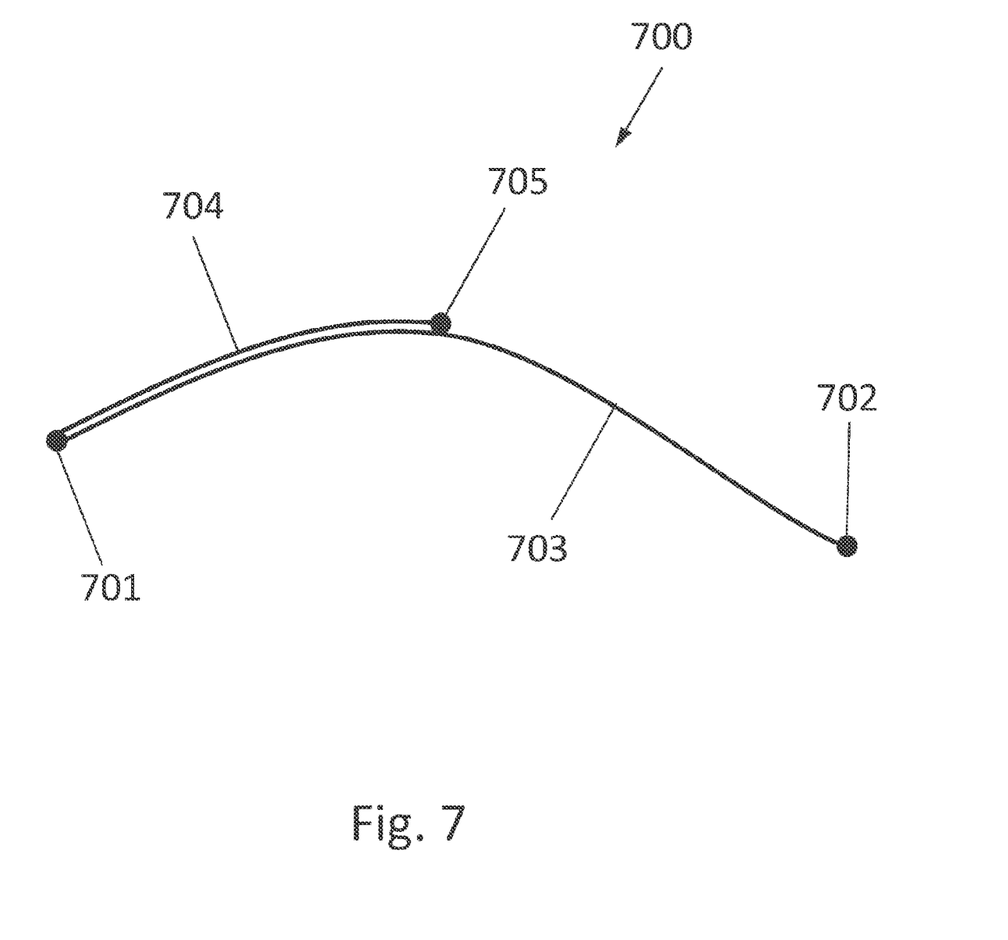
FIG. 7 shows an illustration, in a top view, of the concept of the progress of a transfer.

FIG. 7 illustrates, in a top view, the concept of the progress 700 of a transfer. Proceeding from a start position 701, the utility vehicle (not shown here) is to be transferred, overall, along a route 703 to a target position 702. At an arbitrary point in time during the transfer, a first path portion 704 of the route 703 up to an instantaneous position 705 has already been covered. The progress 700 of the transfer associated with this point in time can then be described by the distance traveled since the beginning 701 of the transfer, i.e., the path length of the first path portion 704 with respect to the likely total distance, i.e., the path length of the route 703.

The sensor 107, 303, 507, 1101 of the utility vehicle 101, 301, 501 can be, for example, a laser scanner, or a still camera, or a video camera. A determination of orientation and distance is possible with only one sensor when at least two reference marks 105, 106, 304, 305, 505, 506, which are positioned in a known way and are detectable in a distinguishable manner, have been applied at the target position.

Figure 8:
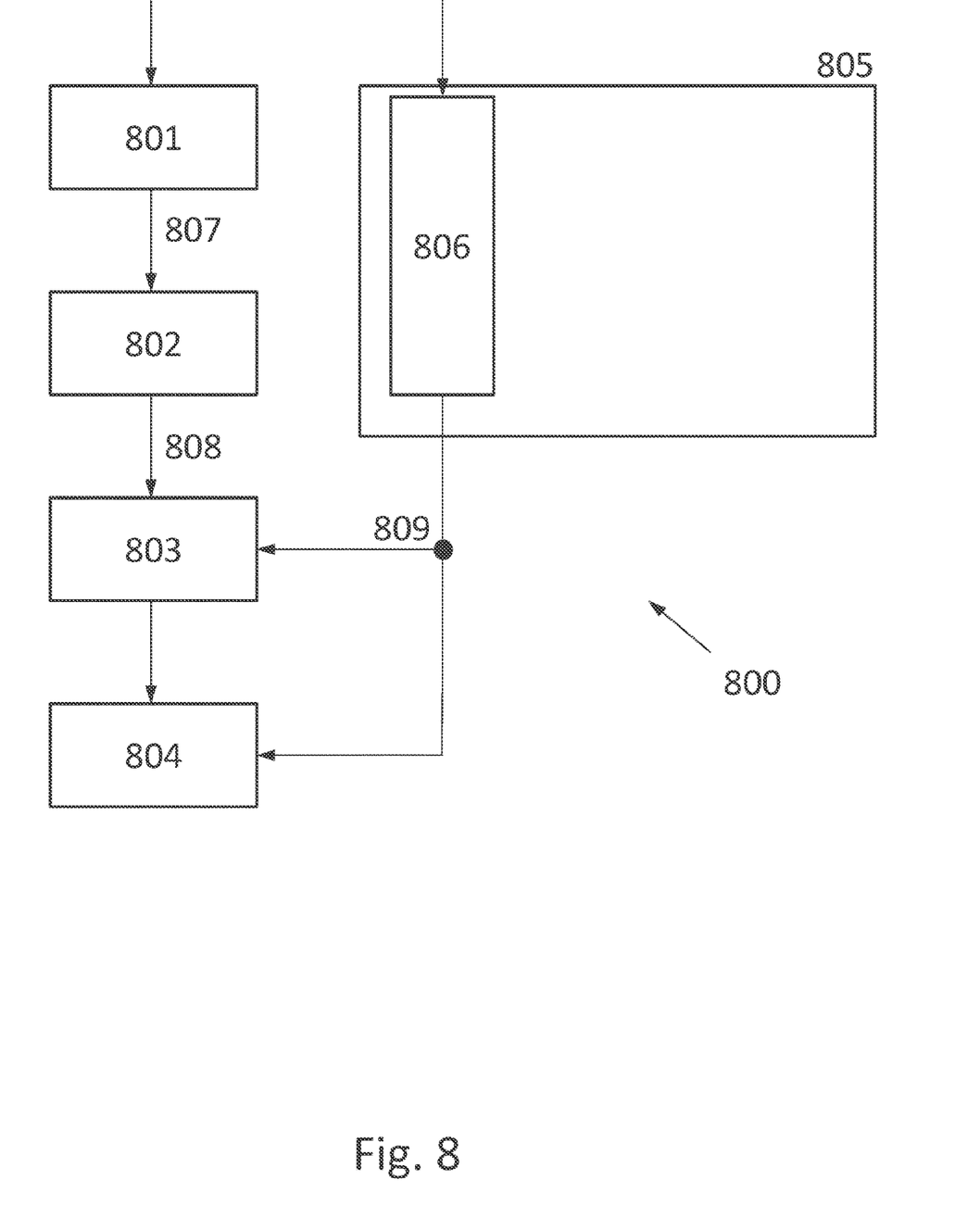
FIG. 8 shows a block diagram for explaining a method according to an embodiment.

FIG. 8 shows a block diagram for explaining a method 800 according to the present disclosure. Such a control method 800 for transferring a utility vehicle into a target position includes:
sensing 801 a relative position 807 of the utility vehicle in relation to the target position,
subsequently deriving 802, from the relative position 807, an automatic, rules-based lateral control 808 of the utility vehicle in such a way that the lateral control 808, together with a longitudinal control, transfers 803 the utility vehicle into the target position,
additionally, checking 806 whether an activation signal 809 generated by an operator 1201 located outside of the utility vehicle is present with the aid of a remote control receiving device 805 of the utility vehicle,
initiating 803 the transfer of the utility vehicle according to the lateral control 808 and the longitudinal control only when the activation signal 809 is present for the first time, and
when the activation signal 809 is absent, interrupting 804 the transfer and bringing the utility vehicle to a standstill, for example, with the aid of a suitable braking action.

Figure 9:
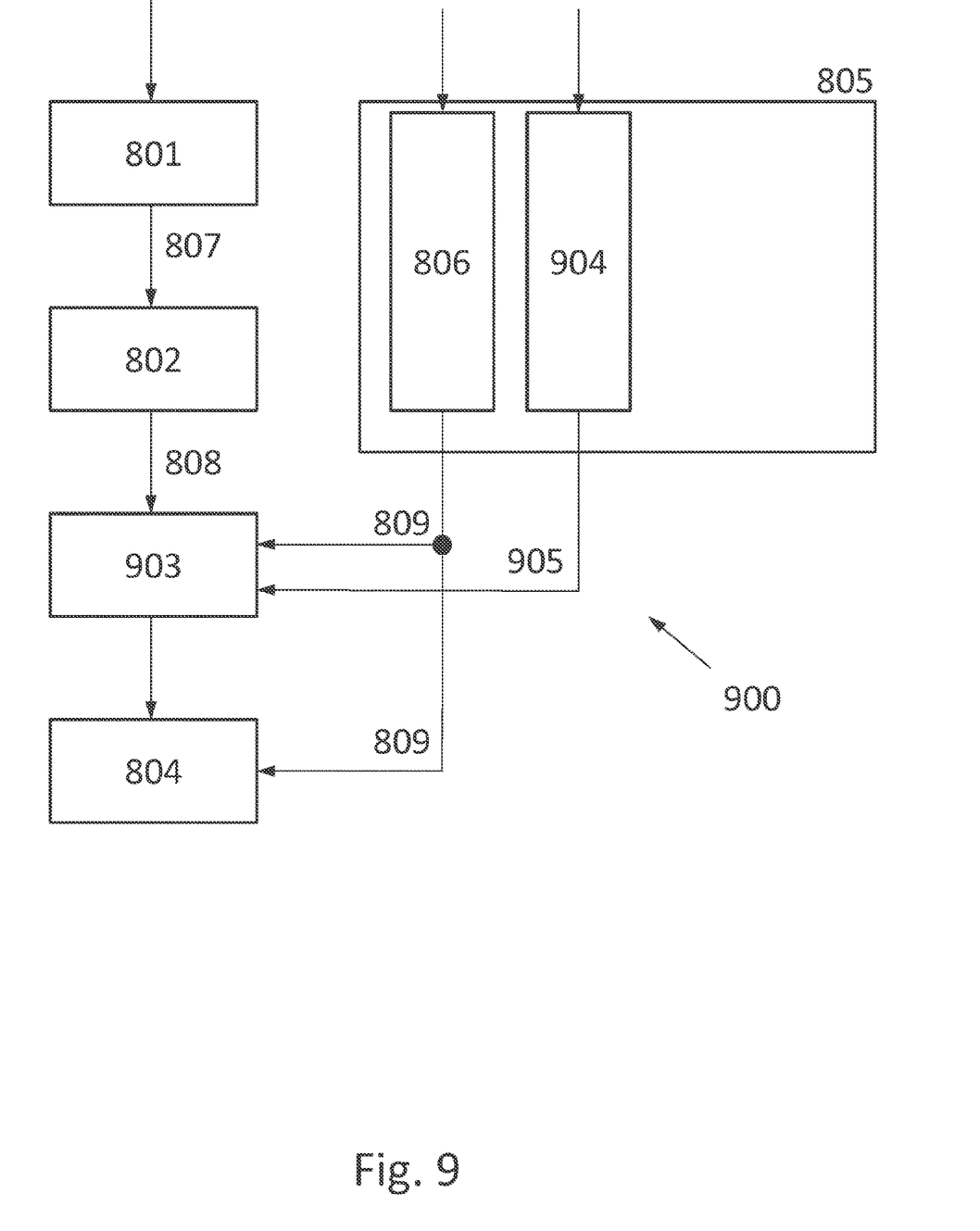
FIG. 9 shows a block diagram for explaining an advantageous expansion of a method according to an embodiment.

FIG. 9 shows a block diagram for explaining an advantageous expansion 900 of a method according to the present disclosure. The expansion 900 includes:
additionally receiving 904, with the remote control receiving device 805, a time-dependent longitudinal control signal 905 input by the operator 1201,
carrying out 903 the transfer according to the lateral control 808 and the received longitudinal control signal 905.

Figure 10:
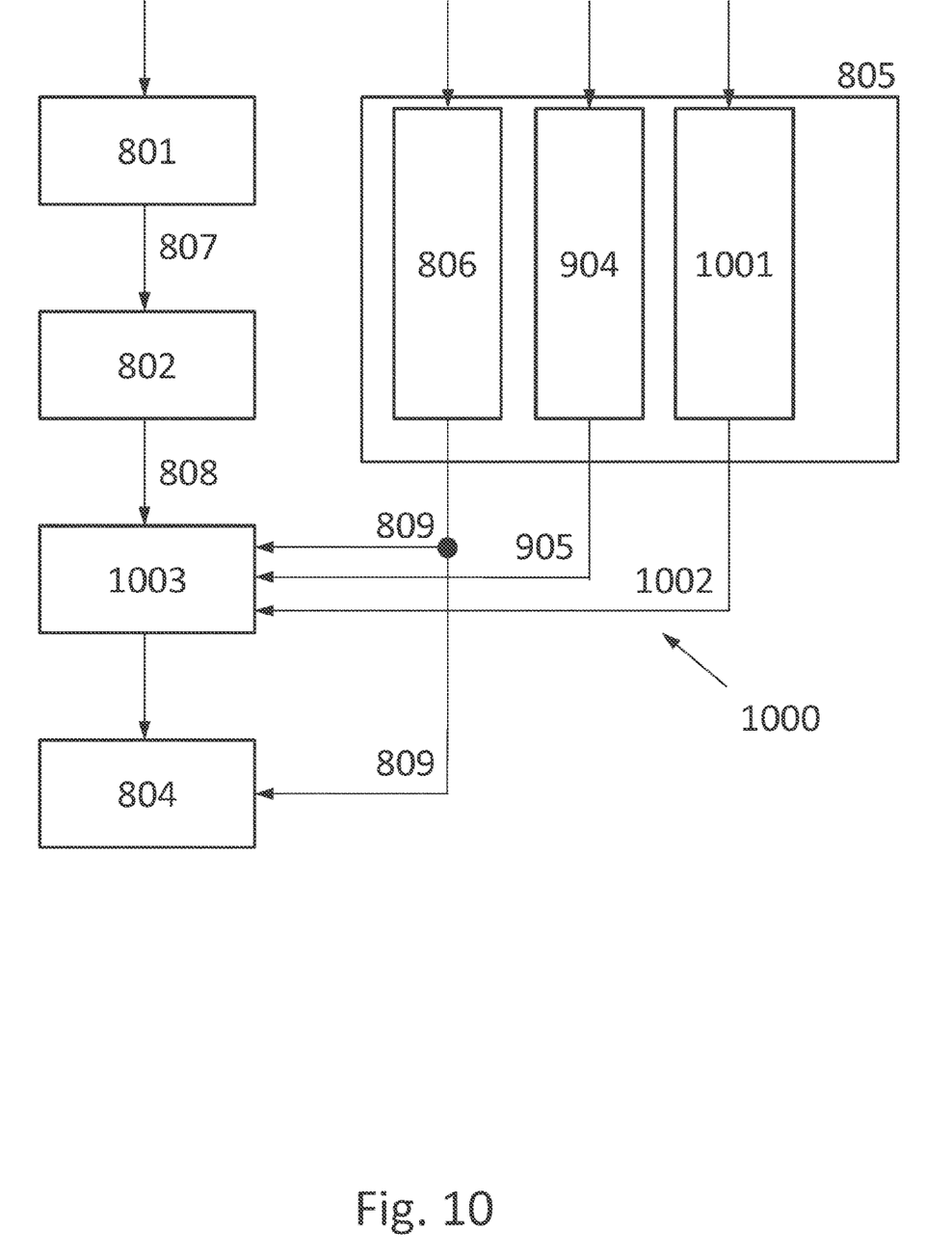
FIG. 10 shows a block diagram for explaining a further advantageous expansion of a method according to an embodiment.

FIG. 10 shows a block diagram for explaining a further advantageous expansion 1000 of a method according to the present disclosure. The expansion 1000 includes:
additionally receiving 1001, with the remote control receiving device 805, a level regulating signal 1002 generated by the operator 1201,
guiding 1003, during the transfer, a level regulating device present in the utility vehicle according to the received level regulating signal 1002.

The remote-controlled guidance 1003 of the level regulating device by the operator 1201 is advantageous, for example, for the case in which the target position is a coupling position 103, because such couplings always also require a sufficiently precise height adjustment of the towing vehicle 101 with respect to the trailer/semitrailer 104 for the purpose of engagement. A level regulating signal predefinable by the operator 1201 is also advantageous when the target position is a loading position at a loading ramp 302, because a stepless transition from the loading ramp 302 into the interior of the utility vehicle 301 is therefore made possible.

Further advantageously, additionally, a level regulating signal 1002 generated by the operator 1201 is received with the remote control receiving device 805 and, during the transfer 1003, a level regulating device of the utility vehicle is guided according to the received level regulating signal 1002.

Further advantageously, when the relative position is sensed 801 as a start position for the first time, a check is carried out to determine whether a transfer to the target position from the start position is even possible and, if not, the transfer is not initiated. Optionally, the operator 1201 can be informed thereof.

Further advantageously, a check is carried out during the transfer to determine whether the remainder of the transfer can even be concluded as intended and without incurring damage and, if not, the transfer is aborted. Optionally, the operator 1201 can be informed thereof.

Figure 11:
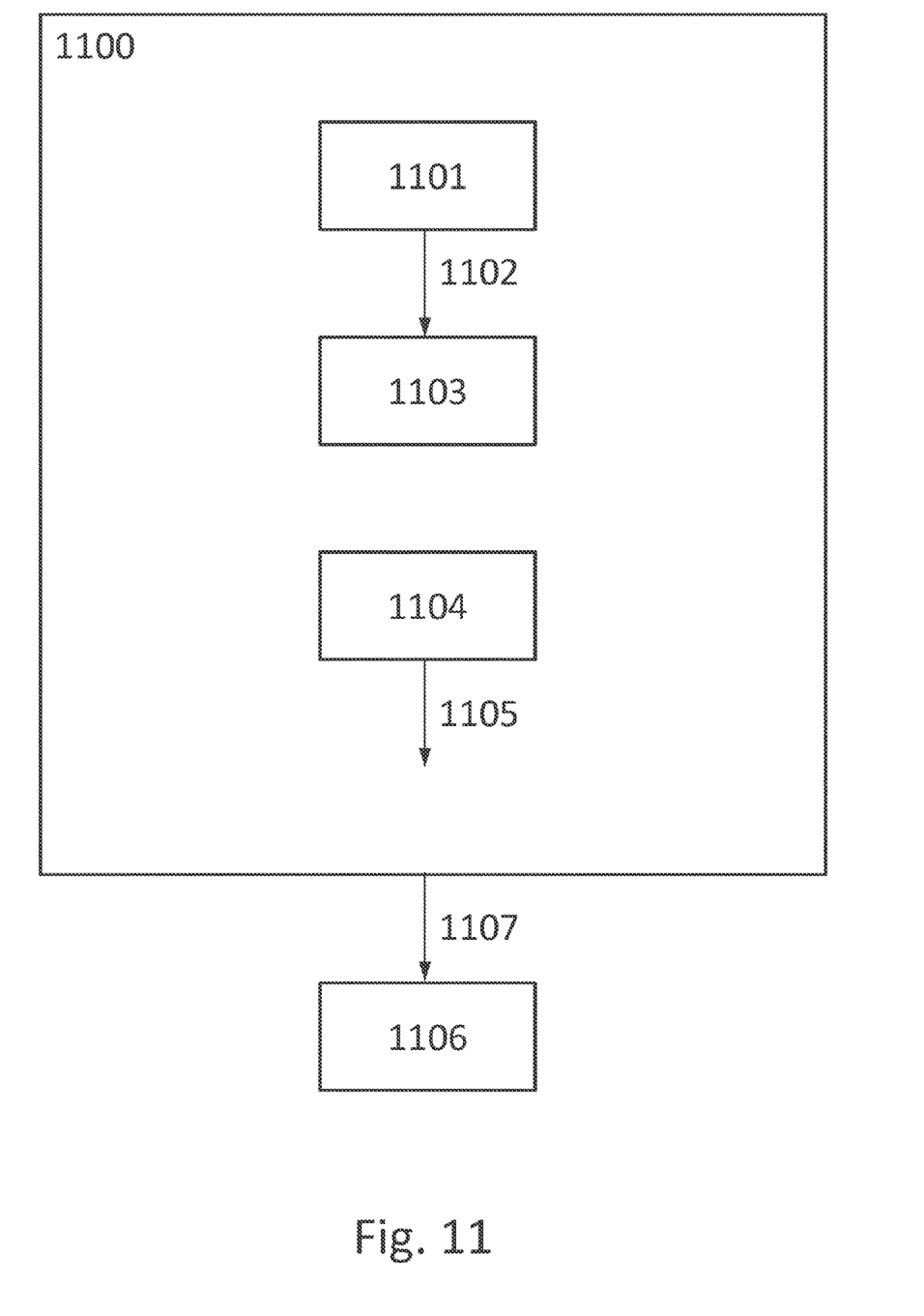
FIG. 11 shows a block diagram for explaining a control device according to an embodiment.

FIG. 11 shows a block diagram for explaining a control device 1100 according to the present disclosure. The control device 1100 comprises:
- a sensor 1101 configured for sensing a relative position 1102 of the utility vehicle in relation to the target position,
- a lateral control device 1103 configured for laterally controlling the utility vehicle automatically and in a rules-based manner on the basis of the sensed relative position 1102 in such a way that the lateral control, together with a longitudinal control, transfers the utility vehicle into the target position by acting 1107 upon an acting device 1106 of the utility vehicle, and
- a remote control receiving device 1104 configured for checking for the presence of an activation signal 1105 generated by an operator 1201 located outside of the utility vehicle with the aid of a remote control transmitter.

The control device 1100 is configured for beginning the transfer of the utility vehicle according to the lateral control and the longitudinal control only when the activation signal 1105 is present for the first time, and is configured for interrupting the further transfer and bringing the utility vehicle to a standstill by acting 1107 upon the acting device 1106 if the activation signal 1105 is absent.

Figure 12:
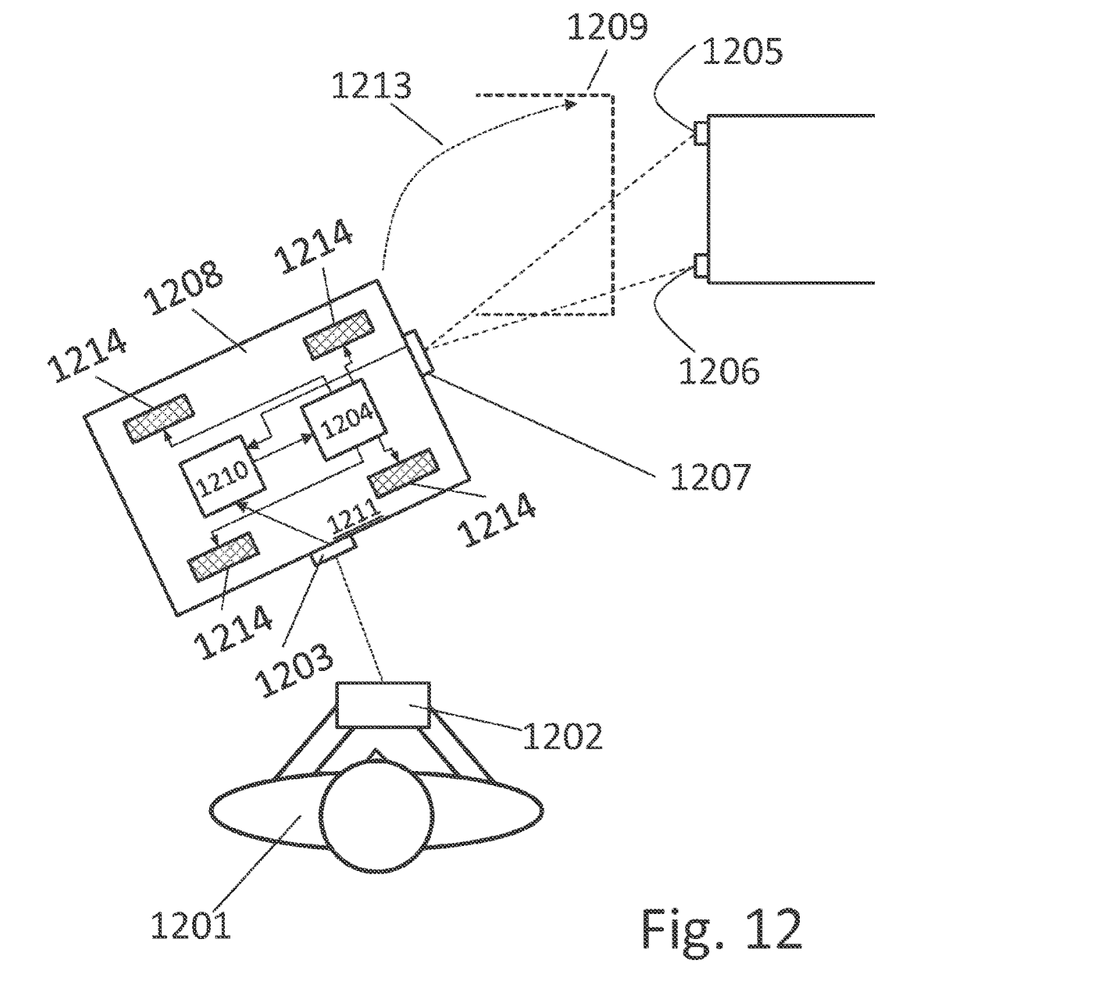
FIG. 12 schematically shows, in a top view, an application with a disembarked operator.

FIG. 12 schematically shows, in a top view, an application with an operator 1201 disembarked from the utility vehicle 1211. The utility vehicle 1211 is shown in its start position 1208 and, with dashed lines, is indicated in its target position 1209, into which it is to be transferred along a route 1213. The utility vehicle comprises:
- an acting device 1204, with which, for example, the wheels 1214 can be acted upon,
- a control device 1210 according to the present disclosure for transferring the utility vehicle 1211 from its start position 1208 into its target position 1209 via the acting device 1204,
- a remote control receiving device 1203 configured for receiving remote control signals 1212, which the operator 1201 generates with a remote control transmitter 1202, and
- a sensor 1207 configured in such a way that it provides the control device 1210 with direction and distance to reference marks 1205, 1206.

Advantageously, the remote control receiving device 805, 1203 is configured for additionally receiving a time-dependent longitudinal control signal 905 input by the operator 1201, and the control device 1100, 1210 is configured for carrying out the transfer 1213 according to the lateral control 808 and the received longitudinal control signal 905.

A utility vehicle 101, 301, 501, 1211 according to the present disclosure is configured for carrying out a control method according to the present disclosure and/or comprises a control device according to the present disclosure.

Figure 13:
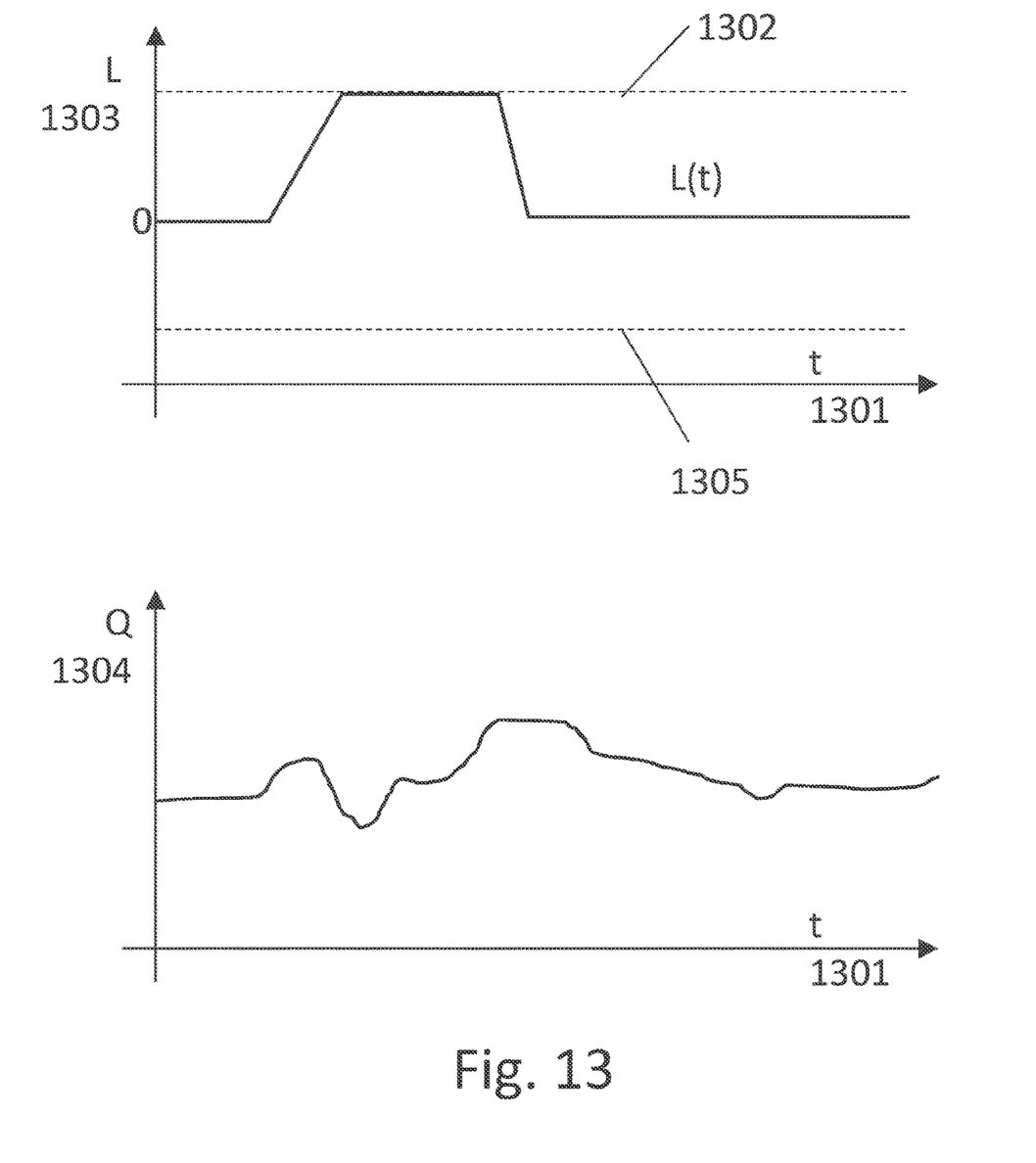
FIG. 13 shows exemplary profiles of a longitudinal control signal and a lateral control over a common time axis.

FIG. 13 shows exemplary profiles of a longitudinal control signal L 1303 and of a lateral control Q 1304 over a common time axis t 1301. The figure shows that the longitudinal control signal L, within the scope of an instantaneous speed, never exceeds a positive maximum speed 1302 and a negative maximum speed 1305. The maximum speeds 1302, 1305 can also be dynamically adapted, for example, to different driving situations.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 101 utility vehicle
102 start position
103 target position
104 semitrailer vehicle
105 reference mark
106 reference mark
107 sensor
108 route
109 route
110 route
301 utility vehicle
302 loading ramp
303 sensor
304 reference mark
305 reference mark
501 utility vehicle
502 operating means port
503 supply device
504 operating means line
505 reference mark
506 reference mark
507 sensor
701 start position, beginning of the transfer
702 target position
703 route
704 path portion
705 instantaneous position
800 method
801 method step sensing
802 method step deriving
803 method step initiating the transfer, transfer
804 method step interrupting the transfer and/or brake application
805 remote control receiving device
806 method step checking for an activation signal
807 relative position
808 lateral control
809 activation signal 900 expansion of the method
903 method step carrying out the transfer, transfer
904 method step receiving a longitudinal control signal
905 longitudinal control signal
1000 expansion of the method
1001 method step receiving a level regulating signal
1002 level regulating signal
1003 method step transferring with guidance of a level regulating device
1100 control device
1101 sensor
1102 relative position
1103 lateral control device
1104 remote control receiving device
1105 activation signal
1106 acting device
1107 method step acting
1201 operator
1202 remote control transmitter
1203 remote control receiving device
1204 acting device
1205 reference mark
1206 reference mark
1207 sensor
1208 start position
1209 target position
1210 control device
1211 utility vehicle
1212 remote control signal
1213 route, transfer
1214 wheels
1301 time axis t
1302 positive maximum speed
1303 longitudinal control signal L
1304 lateral control Q
1305 negative maximum speed

The invention claimed is:

1. A control method for the semi-automatic transfer of a driven utility vehicle into a sensor-identifiable target position, the method comprising:
sensing a relative position of the utility vehicle in relation to the target position;
deriving, from the relative position, an automatic, rules-based lateral control of the utility vehicle configured to, together with a longitudinal control, transfer the utility vehicle into the target position,
detecting, with the aid of a remote control transmitter of the utility vehicle, the presence of an activation signal generated by an operator located outside of the utility vehicle,
initiating, in response to the detection of the presence of the activation signal for the first time, the transfer of the utility vehicle according to the lateral control and the longitudinal control,
detecting an absence of the activation signal and interrupting the transfer to bring the utility vehicle to a standstill, and
carrying out a check when the relative position is sensed as a start position for a first time, the check including determining whether a transfer to the target position from the start position is possible and, if transfer to the target position from the start position is not possible, not initiating the transfer and informing the operator thereof.

2. The control method as claimed in claim 1, further comprising receiving, with the remote control receiving device, a time-dependent longitudinal control signal input by the operator, wherein the transfer takes place according to the lateral control and the received longitudinal control signal.

3. The control method as claimed in claim 1, wherein a limiting of the maximum speed permitted is included as part of the longitudinal control.

4. The control method as claimed in claim 3, wherein the limitation of the maximum speed depends on an instantaneous relative position, on the progress of the transfer, and/or on a current or impending state of the lateral control.

5. The control method as claimed in claim 1, further comprising generating a level regulating signal by the operator with the remote control receiving device and, guiding, during the transfer, a level regulating device of the utility vehicle according to the received level regulating signal.

6. The control method as claimed in claim 1, wherein a check is carried out during the transfer to determine whether the remainder of the transfer can be concluded as intended and without incurring damage and, if not, the transfer is aborted and the operator is informed thereof.

7. A control device for the semi-automatic transfer of a driven utility vehicle with an electronic acting device to a sensor-identifiable target position, comprising:
a sensor configured to sense a relative position of the utility vehicle in relation to the target position, and
a lateral control device configured to laterally control the utility vehicle automatically and in a rules-based manner based on the sensed relative position such that the lateral control, together with a longitudinal control, transfers the utility vehicle into the target position by acting upon the electronic acting device,
wherein a remote control receiving device, configured for checking for the presence of an activation signal generated by an operator located outside of the utility vehicle with the aid of a remote control transmitter, is provided,
wherein the control device is configured to begin the transfer of the utility vehicle according to the lateral control and the longitudinal control in response to detecting a presence of the activation signal for the first time, and to interrupt the transfer and bring the utility vehicle to a standstill in response to a detection of an absence of the activation signal, and
wherein the control device is configured to carry out a check when the relative position is sensed as a start position for a first time, the check including determining whether a transfer to the target position from the start position is possible and, if transfer to the target position from the start position is not possible, the control device being configured to not begin the transfer and inform the operator thereof.

8. The control device as claimed in claim 7, wherein the remote control receiving device is further configured to receive a time-dependent longitudinal control signal input by the operator, wherein the transfer takes place according to the lateral control and the received longitudinal control signal.

9. A utility vehicle comprising a control device as claimed in claim 7.

* * * * *